United States Patent [19]
Lewandowski et al.

[11] 3,905,434
[45] Sept. 16, 1975

[54] PRECISION BALANCE FOR CONTINUOUS MEASUREMENT OF SMALL VARIATIONS OF MASS

[76] Inventors: Witold Lewandowski, Olsztynska str. 8c/11; Ryszard Werkowski, Gospody str. 11d/21, both of Gdansk-Oliwa; Henryk Gliszewski, Marchlewskiego str. 10E/6, Gdansk-Wrzeszcz, all of Poland

[22] Filed: Aug. 27, 1973

[21] Appl. No.: 391,680

[30] Foreign Application Priority Data
Aug. 28, 1972 Poland .................................. 157523

[52] U.S. Cl. ............................... 177/208; 177/207
[51] Int. Cl.² ............................................. G01G 5/04
[58] Field of Search ........................... 177/207–209, 177/246, 254; 73/1, 37, 388, 406, 141

[56] References Cited
UNITED STATES PATENTS

| | | | |
|---|---|---|---|
| 2,592,569 | 4/1952 | Henderson | 73/228 |
| 2,634,082 | 4/1953 | Knobel | 177/208 |
| 2,773,685 | 12/1956 | Aagaard | 177/208 |
| 2,885,889 | 5/1959 | Trimmer | 73/141 |
| 3,057,420 | 10/1962 | Swartz | 177/208 X |
| 3,108,649 | 10/1963 | Hamilton | 177/208 |
| 3,495,669 | 2/1970 | Teager et al. | 177/194 |
| 3,581,836 | 6/1971 | Segerdahl et al. | 177/208 |
| 3,765,497 | 10/1973 | Thordarson | 177/208 |

FOREIGN PATENTS OR APPLICATIONS

| | | | |
|---|---|---|---|
| 976,145 | 3/1951 | France | 177/208 |
| 1,033,098 | 6/1966 | United Kingdom | 177/208 |
| 104,302 | 1898 | Germany | 177/208 |

*Primary Examiner*—Stephen J. Tomsky
*Assistant Examiner*—Vit W. Miska
*Attorney, Agent, or Firm*—Waters, Schwartz & Nissen

[57] ABSTRACT

Analytical precision balance for continuous measurement of small variations of mass comprising a conventional balance beam, a diaphragm firmly connected with the balance beam and a nozzle for the diaphragm. The nozzle is connected by means of a conduit and a fixed resistor to a low-pressure feeder. The feeder consists of a pump and a stabilizer for supplying gaseous medium at a pressure below 10 kN/m², i.e., below 0.1 atm.g.p., in order to form a cushion. The nozzle is also connected with an amplifier and an indicating recorder forming the measuring system. The diaphragm has a spherical shape facing the nozzle.

1 Claim, 1 Drawing Figure

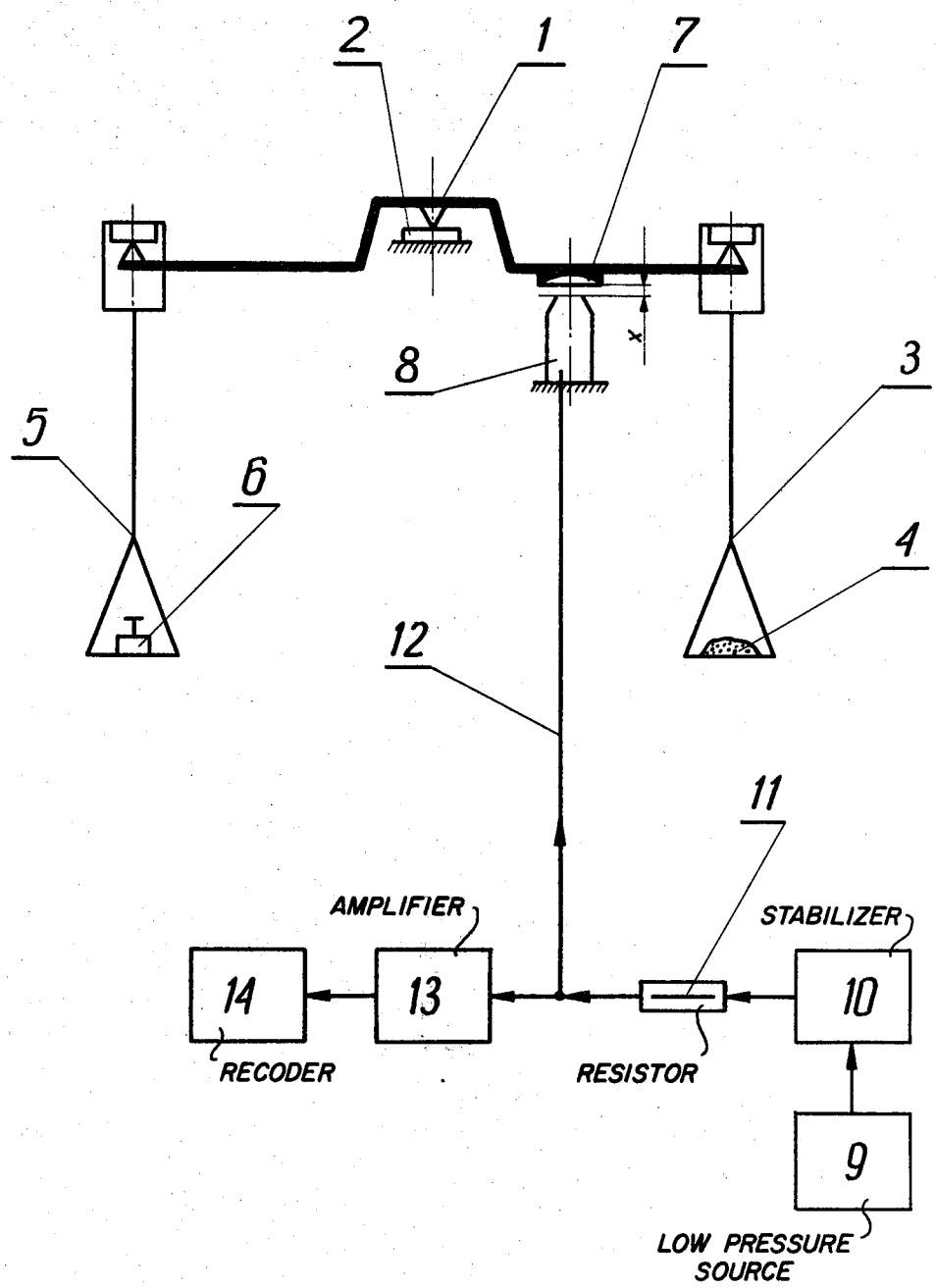

PRECISION BALANCE FOR CONTINUOUS MEASUREMENT OF SMALL VARIATIONS OF MASS

The invention relates to a precision balance adapted for continuous measurement of small variations of mass.

There are known precision balances of mechanical operation, in which the mass is balanced with weights, and the deflection of the balance beam is displayed on a screen by means of an optical system. Such balances are not suitable for continuous measurement of mass, and the optical system introduces reading errors, as for example, at angles of tilt.

There are further known precision balances in which the balancing of the mass is performed with magnetic or electric forces. Such balances enable the continuous measurement of the mass as a function of system. or of parameters determining the mass variations of the substance to be investigated, but the motor operators of the balance, being operative in the course of the weighing process, generate a magnetic field which is harmful for the weighing system of the device, thus affecting the readings of the balance. Moreover, these balances are characterized by very complicated and undependable structure.

An object of the invention is a balance adapted for continuous measurement of mass with an accuracy corresponding to that of balances of equal class, free from disadvantages of known arrangements of the same art, and characterized by simple structure.

This object is achieved by arranging a gap of variable thickness between a diaphragm mounted on the balance beam and the nozzle of a pneumatic system, said nozzle being connected with a low-pressure feeder, via a fixed resistor and a stabilizer, and through an amplifier with an indicating recorder.

The balance according to the invention make possible measurement of mass in a continuous manner, in chemical and analytical laboratories, for example in order to determine the rate of evaporation for investigations of hygroscopic substances, for investigations of metal corrosion, or for thermogravimetric investigations and measurements.

The invention is hereinbelow described in detail by way of an exemplary embodiment shown diagrammatically in the sole FIGURE of the accompanying schamtic drawing.

A balance beam 1 is suspended on the knife-edge of scales 2 and a diaphragm 7 is fastened to the beam 1 and faces a nozzle 8 fastened to the balance frame. The diaphragm 7 is fixedly attached to the balance beam 1 and has a spherical surface facing the nozzle, the nozzle and diaphragm being disposed in adjacent parallel planes. By means of conduit 12 containing resistor 11 and stabilizer 10, the nozzle 8 is connected with a low-pressure feeder 9. The nozzle is also connected via amplifier 13 with an indicating recorder 14.

On placing the mass 4 to be weighed on the scale pan 3, said mass exceeding, for example, the measuring range of the indicating recorder 14, the nozzle 8 becomes closed by the diaphragm 7. Then the pressure in the nozzle 8 is increased and the indicating recorder 14 indicates the condition in which the upper limit of the measuring range is exceeded.

In this case, the balance beam 1 is balanced by putting a mass of weights 6 on the scale pan 5.

The measure of the mass 4 to be weighed is the mass of the weights 6 plus the reading on the indicating recorder 14.

In the event there is placed on the scale pan 5 a mass of weighed 6 exceeding the mass 4 to be weighted, the balance beam 1 deflects in such a way that the gap "$x$" (between the nozzle and diaphragm) becomes enlarged, and the indicating recorder 14 indicates zero. Then a portion of the weights 6 is to be removed from the scale pan 5, whereafter the weighting process will be conducted as before.

The air supplied to the system from the feeder 9, having a pressure reduced to a constant value by the stabilizer 10 and the fixed resistor 11, flows through the conduit 12 to the nozzle 8. In dependance on the balancing condition of the force produced as a the nozzle 8 in result of the static action of the pressure on the diaphragm 7, and the force caused by unbalancing of the mass 4 with the weights 6, the gap "$x$" automatically causes the fixing of such a pressure in the nozzle 8, which secures the static balance of all forces acting on the balance beam 1.

The pressure in the nozzle 8 is proportional to the mass 4 to be weighed, within the measuring range, which enables employing conventional indicating recorders 14 for the measurements of the mass.

What is claimed is:

1. An analytical precision balance for continuous measurement of small variations of mass, said balance comprising a balance beam, a knife-edge support for said balance beam disposed at an intermediate location along the length thereof, means for suspending a body whose mass is to be measured on said beam at a location spaced from said knife-edge support, a diaphragm fixedly secured to said balance beam, a stationary nozzle spaced from and facing said diaphragm, said diaphragm having a spherical surface facing said nozzle, a low-pressure fluid source, conduit means coupled to said source for supplying low pressure fluid to said nozzle to form a fluid cushion between the nozzle and the diaphragm to assist in balance of said beam, the balance position of the beam changing due to variation in mass of said body to vary the spacing between the nozzle and the diaphragm, such variation producing pressure change of the fluid in said conduit means, and indicator means coupled to said conduit means for responding to said pressure change of the fluid in said conduit means to provide a continuous measurement of small variations of the mass of said body.

* * * * *